July 26, 1932.   G. W. PERKS   1,869,021
EXPANSION JOINT OR COUPLING
Filed May 5, 1927   2 Sheets-Sheet 1
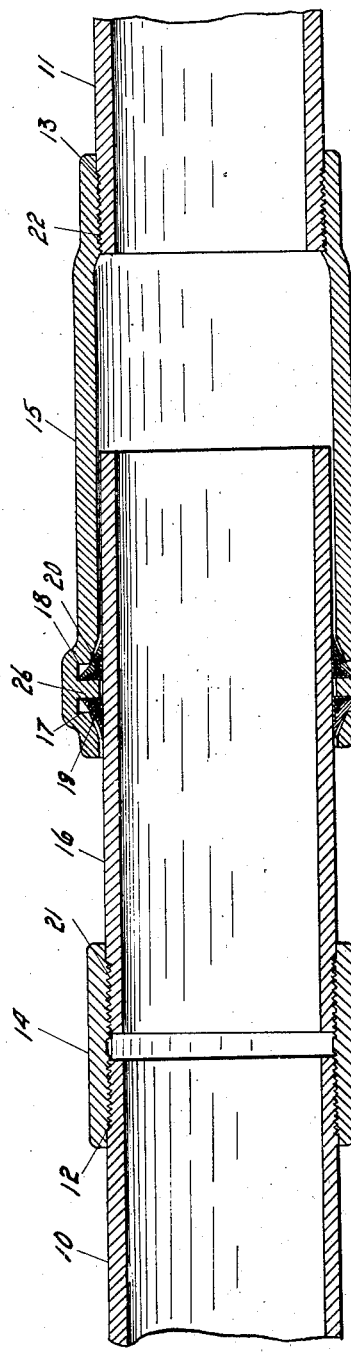
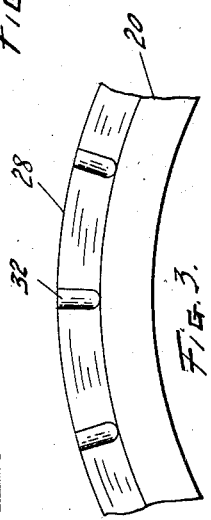
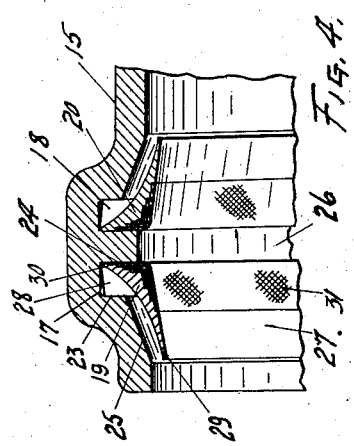
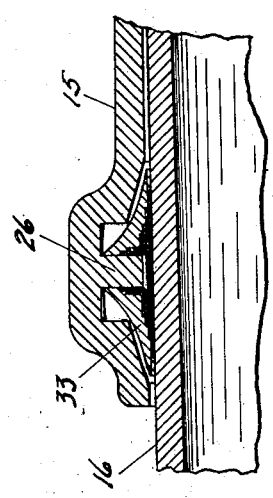
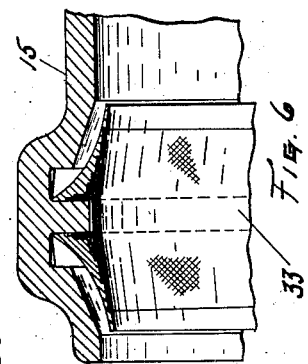
INVENTOR.
GEORGE W. PERKS.
BY Ely H Barrow
ATTORNEYS.

July 26, 1932.  G. W. PERKS  1,869,021
EXPANSION JOINT OR COUPLING
Filed May 5, 1927   2 Sheets-Sheet 2
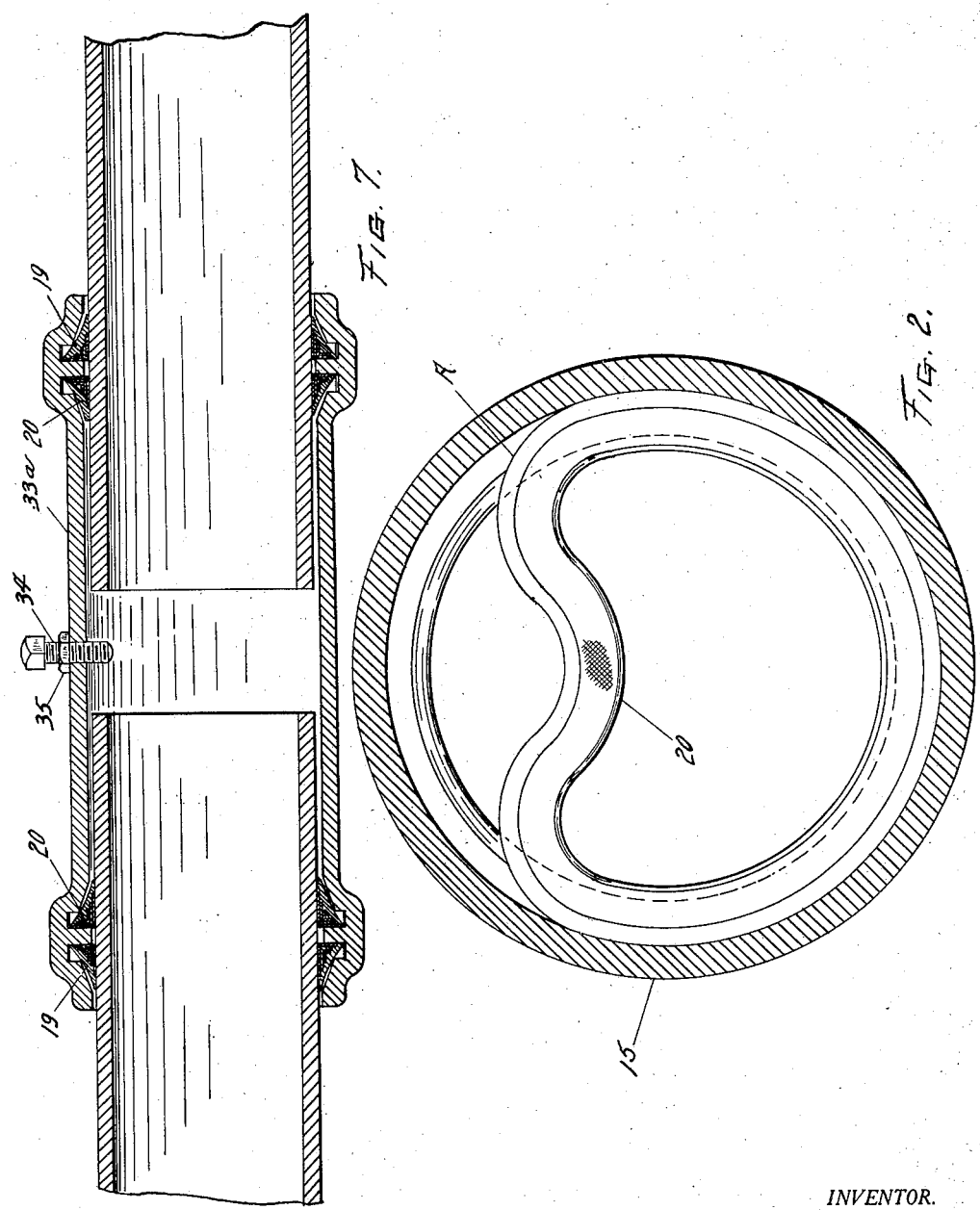
INVENTOR.
GEORGE. W. PERKS.
BY Ely & Barrow
ATTORNEYS.

Patented July 26, 1932

1,869,021

UNITED STATES PATENT OFFICE

GEORGE W. PERKS, OF AKRON, OHIO, ASSIGNOR OF ONE-HALF TO JOHN R. GAMMETER, OF AKRON, OHIO

EXPANSION JOINT OR COUPLING

Application filed May 5, 1927. Serial No. 188,934.

This invention relates to expansion joints and has particular reference to an expansion joint, union coupling, or accommodation joint having means for automatically sealing the same with a pressure operated packing.

The purpose of the invention is to devise an expansion joint of the slip joint or telescopic type, having a pressure operated packing adapted to automatically seal the joint at any degree of pressure or vacuum within the pipe line. An object of the invention is to provide a joint comprising a pair of telescoped sleeves or nipples preferably having their outer ends screw-threaded for connection with standard pipe, or well casing or tubing, one of the sleeves having a circumferential groove carrying a pressure operated gasket. A further object is to provide an expansion joint comprising a telescopic coupling sleeve carrying a pair of oppositely positioned pressure packing gaskets, whereby the joint may be effectively sealed when subjected intermittently to partial vacuum and to pressures greater than atmospheric to meet the conditions occurring in gas and oil well and other pipe lines used for the transmission of gas or liquids.

Another object is to provide a variable length accommodation coupling or union which may be inserted between the adjacent ends of two existing pipe lines for coupling the same and compensating for the variable length of the gap between the pipe line ends.

A further object is to provide a preformed packing ring or gasket which may be easily inserted in the groove or grooves of the expansion joint sleeve and which will cooperate with the coupling structure to produce a fluid-tight joint at all degrees of pressure or vacuum within the pipe line when the latter is subjected to intermittent expansion and contraction.

The foregoing and other objects are obtained by the device illustrated in the accompanying drawings and described below. It is to be understood that the invention is not limited to the specific form thereof disclosed herein.

Of the accompanying drawings:

Figure 1 is a longitudinal section of a portion of a pipe line and illustrating an expansion joint embodying the principles of the invention;

Figure 2 is an enlarged scale transverse section showing the method of inserting the gasket;

Figure 3 is a detail elevation of a portion of the gasket;

Figure 4 is a detail section of the outer coupling sleeve and gasket before the inner sleeve is inserted;

Figure 5 is a longitudinal detail section of the expansion joint having a modified form of gasket positioned therein;

Figure 6 is a detail section of the outer coupling sleeve and the modified gasket before the inner sleeve is inserted; and Figure 7 is a longitudinal section of a further modified embodiment of the invention illustrating a duplicate end coupling sleeve.

Referring more particularly to the drawings, 10 and 11 represent two adjacent sections of a pipe line, each being provided with screw threads 12 and 13, respectively, and section 10 being provided with a threaded coupling collar 14. These sections may be the ends of two existing pipe lines having a variable gap therebetween and which lines are to be coupled by the device of the invention serving as a variable length or accommodation union. Or one of the sections may be an end of a pipe line which is being laid and the other section the next length to be connected thereto. In the latter case a predetermined gap is allowed for the insertion of the device of the invention serving as an expansion joint to compensate for intermittent expansion and contraction in the pipe line.

The expansion joint comprises outer and inner telescoped sleeves 15 and 16 respectively, the outer sleeve being provided in its telescoped end with a pair of internal circumferential grooves or channels 17 and 18 in which pressure packing gaskets 19 and 20, respectively, are to be inserted for sealing the joint. The remote ends of the sleeves are provided with screw threads 21 and 22 to mate with the threads of pipe section 11 and coupling 14 respectively. Outer groove 17 is formed with a portion rectangular in cross-section providing radial outer and inner side walls 23 and 24, respectively, and formed with a portion conical in cross-section, in communication with the rectangular portion, said conical portion forming a beveled wall 25 axially outward of said rectangular portion. Inner groove 18 is similar in cross-section, but has its conical and rectangular portions reversely positioned, the groove 18 being spaced apart from groove 17 to provide an intervening web or rib 26 against which gaskets 19 and 20 may abut.

Gaskets 19 and 20, molded of a tough, flexible rubber composition, normally have a tapered inner surface 27, as shown in Figure 4, a body portion or radial flange 28 rectangular in cross-section, and a tapered lip 29. The radial surface 30 and inner surface 27 of the gasket may be reinforced with a bias-cut fabric 31 of wire, cotton or the like, molded into the gasket in one or more layers to produce a reinforced heel portion. Such bias fabric reinforcement will permit the gasket to be readily inserted in the groove and radially compressed around the inner sleeve 16, yet will prevent the gasket from being blown out of the joint due to softening, cold flow, or misalignment of the pipe sections. The rectangular body portion 28 of the gasket is preferably made slightly wider than the groove in which it is to be held, in order to produce an initial longitudinal compression to seal the outer face of the gasket and to hold the gasket tightly between the walls of the groove to prevent its dislodgment during the insertion of the inner sleeve. The assembly of the joint and insertion of the gasket may be performed in the factory in order to facilitate the connection of the joint with the pipe line in the field. To insert the gasket in the groove, it is reversely folded as illustrated in Figure 2 to contract the body portion of the gasket at point A. The gasket is then easily inserted by progressively folding the same around its entire circumference and forcing the folded portion into the groove, the gasket taking the position shown in Figure 4. The inner sleeve 16, which is preferably coated or plated with brass, copper, zinc or the like to form a smooth surface, is next inserted within the outer sleeve, a split sleeve or plurality of segmental strips (not shown) being employed to spread the lip portion of the outer gasket while the sleeve is being inserted, after which, such spreading means may be removed. The lip of the inner gasket will be spread by the insertion of the inner sleeve, the spreading of the lip portions of both gaskets, thus providing an initial sealing of the joint before pressure is applied. This sealing is aided by coating the gasket with a suitable lubricant or like substance, the latter also facilitating the assembly of the joint. Body portion 28 is provided with a number of slots or ducts 32 to admit pressure to the outer periphery of the radial flange so that fluid pressure within the pipe line may be effective about the entire radially outer surface thereof, said fluid pressure tending to compress the gasket radially inwardly to seal the same against the inserted sleeve and longitudinally outwardly to seal the gasket against rib 26. These forces are normal to the curved radially outer face of the gasket and their resultant is directed toward the annular opening between the circumferential rib 26 and sleeve 16 so that after pressure is turned into the pipe line, the gasket assumes the position shown in Figure 1. When the pressure within the pipe line is greater than atmospheric the inner gasket effects the sealing of the joint, while if a partial vacuum exists in the pipe line the outer gasket seals the joint. Obviously if the joint is to be used on lines where only the former condition exists, the outer gasket may be omitted, while on lines where a partial vacuum is always present, the outer gasket may be employed alone. The expansion joint is connected to the pipe line by inserting it between the ends of the latter in its fully telescoped condition, screwing one sleeve into the adjacent pipe threads, then drawing out the sleeves sufficiently and screwing in the other end. Sufficient clearance is allowed between the outer and inner sleeves of the joint, so that slight angular displacements or misalignment of the pipe line may be taken up by the expansion joint.

Figures 5 and 6 illustrate a modified form of packing ring wherein the two gaskets are joined by a web of rubber and fabric to make an integral gasket structure 33. The assembly and operation thereof are identical with the first-mentioned form of packing.

Figure 7 is a modified form of coupling for use with threadless butt-joint pipe lines, wherein the coupling sleeve 33ª is provided on each end with a double pressure packing seal, duplicating the joint illustrated in Figure 1. The sleeve in this case is provided with a suitable central stop member such as screw 34, for preventing the joint from sliding off either pipe end. This form of expansion coupling sleeve is assembled by sliding the entire sleeve, with screw 34 removed, over one pipe end, aligning the other pipe end, and sliding the sleeve back over the latter. Screw 34 is then inserted and tightened with a locknut 35.

An expansion joint or union thus constructed is particularly adapted for use in oil or gas fields, where pipe lines are subjected to varying temperatures causing contraction and expansion thereof and to varying pressures caused by pressure of oil or gas in the well or partial vacuums created by pumps placed in the pipe lines. In being radially compressed around the inner sleeve, the gasket will take up any irregularities in the pipe surfaces and, owing to the fabric reinforcement, will not blow out when used in joints where a maximum of clearance is allowed.

Modifications of the invention may be resorted to without departing from the spirit thereof or the scope of the appended claims.

What is claimed is:

1. An expansion joint comprising outer and inner, relatively reciprocable, telescoping sleeves adapted to be connected to adjacent ends of a pipe line, said outer sleeve having a pair of internal circumferential grooves in its overlapping end defining an inner, circumferential rib, and a pair of pressure operated gaskets positioned on opposite sides of said rib in the grooves for free radial movement and having oppositely facing surfaces exposed to atmospheric pressure and to the pressure within the pipe line, respectively, whereby the joint may be effectively sealed about said rib with any degree of pressure or partial vacuum within the pipe line.

2. An expansion joint comprising outer and inner, relatively reciprocable, telescoping sleeves adapted to connect adjacent sections of a pipe line, pressure operated packing means housed within the outer sleeve for free radial movement and having surfaces exposed to the high pressure side of the joint both internally or externally of the joint, an internal circumferential abutment within the outer sleeve and against which the sides of the packing means opposite said surfaces may abut, and a tapered lip on each side of said packing means, each of said lips being radially compressible about the inner sleeve and said packing means being compressible against the circumferential abutment, by pressure for sealing the joint.

3. An adjustable length insertible union for connecting the adjacent ends of a pair of pipe lines, comprising inner and outer, relatively reciprocable, telescoping sleeves adapted to be connected to said pipe line ends, a radially movable pressure packing gasket housed within the outer sleeve and seated against the latter and against said inner sleeve for sealing the joint by means of pressure within the pipe line, a second radially movable pressure packing gasket housed within the outer sleeve, positioned oppositely to the first gasket, and seated against the outer and inner sleeves for sealing the joint by means of atmospheric pressure, and means providing an abutment against which both of said rings are urged when subjected to pressure.

4. An expansion pipe coupling comprising telescoped outer and inner, relatively reciprocable, tubular sleeves, said outer sleeve having a groove formed in the overlapping end thereof, said groove having radial outer and inner side walls, and a normally internally tapered gasket positioned in the groove and encircling the inner sleeve, said gasket having a body portion normally wider than the groove so as to be tightly gripped by the radial walls thereof when in place, one or more slots in the rear of the body portion to permit fluid pressure to enter the groove, and a tapered lip portion extending laterally of said body portion and adapted to embrace the inner sleeve, whereby the entire gasket may be radially compressed against the inner sleeve by means of a difference in fluid pressure inside and outside the pipe line.

5. An expansion coupling comprising telescoped outer and inner, relatively reciprocable, tubular sleeves adapted to be connected to the ends of adjacent pipe sections, said outer sleeve having an internal groove formed therein, a flexible gasket positioned in the groove and surrounding the inner sleeve, an outwardly extending flange on the gasket, said flange being normally wider than the groove whereby it may be tightly gripped by the side walls of said groove when positioned therein, means for providing communication for fluid pressure to the interior of the groove, and a tapered lip extending axially from one side on the inner end of the gasket and engaging the inner sleeve, said gasket being radially movable within the groove whereby it may be tightly compressed around the inner sleeve and against a wall of the groove by fluid pressure exerted thereupon.

6. A pipe joint comprising telescoped pipe ends, a radial groove in the outer pipe end, the inner wall of the groove extending inwardly to an inwardly tapered wall portion, a normally internally tapered gasket positioned in the groove and embracing the inner pipe end, said gasket having a body portion substantially rectangular in cross-section and normally wider than the groove so as to be tigthly gripped by the radial walls thereof, one or more slots in the rear or inner side of the body portion to permit fluid pressure to enter the groove, a tapered lip portion extending longitudinally inwardly of the outer pipe end and adapted to lie within the tapered portion of the groove, and a bias fabric reinforcement in the longitudinally outward and radially inward portions of the gasket to prevent the gasket from being blown out of the joint and to allow the gasket to be radially compressed against the inner pipe end by fluid pressure within the pipe line.

7. A pipe joint comprising telescoped pipe ends of adjacent pipe sections, the outer pipe end having an internal radial groove, an internally tapered flexible gasket positioned in the groove and surrounding the inner pipe end, a radial flange on the gasket, said flange being normally wider than the groove whereby it may be tightly gripped by the side walls of said groove when positioned therein, ducts through the flange providing communication of fluid pressure from the interior of the pipe sections to the interior of the groove, a tapered lip on the inner end of the gasket, said lip engaging the inner pipe end, and a bias fabric reinforced heel on the outer side of the gasket, said gasket being radially movable within the groove whereby it may be tightly compressed around the inner pipe end and against the outer wall of the groove by fluid pressure within the pipe sections.

8. A pipe joint comprising telescoped pipe ends, said outer pipe end having an internal groove for holding a sealing gasket, a pressure operated gasket positioned in the groove and encircling the inner pipe end, the entire body of the gasket being radially inwardly compressible by fluid pressure within the groove so as to be tightly compressed about the spigot pipe end, said gasket having means therein to provide communication for fluid pressure from the pipe interior to the groove, and a tapered lip on the gasket extending into the outer pipe end and into engagement with the inner pipe end whereby it may be radially compressed against the inner pipe end by fluid pressure within the pipe line.

GEORGE W. PERKS.